(12) United States Patent
Luo et al.

(10) Patent No.: US 11,631,163 B2
(45) Date of Patent: Apr. 18, 2023

(54) MOBILE DATA AUGMENTATION ENGINE FOR PERSONALIZED ON-DEVICE DEEP LEARNING SYSTEM

(71) Applicant: Samsung Electronics Co., Ltd., Suwon-si (KR)

(72) Inventors: Chenchi Luo, Plano, TX (US); Yingmao Li, Allen, TX (US); Youngjun Yoo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/946,989

(22) Filed: Jul. 14, 2020

(65) Prior Publication Data

US 2021/0248722 A1 Aug. 12, 2021

Related U.S. Application Data

(60) Provisional application No. 62/972,683, filed on Feb. 11, 2020.

(51) Int. Cl.
*G06N 3/04* (2006.01)
*G06T 5/50* (2006.01)
*G06T 5/00* (2006.01)
*G06T 3/40* (2006.01)

(52) U.S. Cl.
CPC .............. *G06T 5/007* (2013.01); *G06N 3/04* (2013.01); *G06T 3/4046* (2013.01); *G06T 5/50* (2013.01)

(58) Field of Classification Search
None
See application file for complete search history.

(56) References Cited

U.S. PATENT DOCUMENTS

| 10,311,337 | B1 | 6/2019 | Kim et al. |
| 10,325,185 | B1* | 6/2019 | Kim .................... G06K 9/6221 |
| 10,373,073 | B2 | 8/2019 | Kisilev |
| 10,467,503 | B1* | 11/2019 | Kim .................... G06K 9/6256 |
| 2016/0358038 | A1* | 12/2016 | Jaderberg ............ G06K 9/4628 |
| 2017/0206405 | A1* | 7/2017 | Molchanov ........ G06K 9/00355 |
| 2019/0005355 | A1* | 1/2019 | Joyce ................... G06K 9/6262 |
| 2019/0122073 | A1* | 4/2019 | Ozdemir .............. A61B 6/5217 |

(Continued)

FOREIGN PATENT DOCUMENTS

WO  WO-2020038589 A1 *  2/2020  .......... G06K 9/6256

OTHER PUBLICATIONS

Kumar et al., "Feature Map Augmentation to Improve Rotation Invariance in Convolutional Neural Networks," Springer Nature Switzerland AG, 2020, pp. 348-359.

*Primary Examiner* — Aaron M Richer

(57) ABSTRACT

A method includes processing, using at least one processor of an electronic device, each of multiple images using a photometric augmentation engine, where the photometric augmentation engine performs one or more photometric augmentation operations. The method also includes applying, using the at least one processor, multiple layers of a convolutional neural network to each of the images, where each layer generates a corresponding feature map. The method further includes processing, using the at least one processor, at least one of the feature maps using at least one feature augmentation engine between consecutive layers of the multiple layers, where the at least one feature augmentation engine performs one or more feature augmentation operations.

20 Claims, 7 Drawing Sheets

(56) References Cited

U.S. PATENT DOCUMENTS

| | | | |
|---|---|---|---|
| 2019/0147621 A1* | 5/2019 | Alesiani | G06T 7/50 382/190 |
| 2020/0042833 A1 | 2/2020 | Toor et al. | |
| 2021/0034921 A1* | 2/2021 | Pinkovich | G06N 3/0454 |
| 2021/0073588 A1* | 3/2021 | Wong | G06K 9/6256 |
| 2021/0106314 A1* | 4/2021 | Aladahalli | G06K 9/00671 |
| 2021/0241096 A1* | 8/2021 | Baskin | G06N 3/08 |

* cited by examiner

MOBILE DATA AUGMENTATION ENGINE FOR PERSONALIZED ON-DEVICE DEEP LEARNING SYSTEM

CROSS-REFERENCE TO RELATED APPLICATION AND PRIORITY CLAIM

This application claims priority under 35 U.S.C. § 119(e) to U.S. Provisional Patent Application No. 62/972,683 filed on Feb. 11, 2020.

TECHNICAL FIELD

This disclosure relates generally to machine learning systems. More specifically, this disclosure relates to a mobile data augmentation engine for a personalized on-device deep learning system.

BACKGROUND

Machine learning has traditionally been performed on servers and other high performance computing devices due to high memory and processing power requirements. For example, some conventional deep learning systems are trained offline in graphics processing unit (GPU) clusters. Original training images for the deep learning system are typically derived from a large public dataset, such as ImageNet. The dataset is placed in some external storage, such as a hard drive or solid state drive (SSD). When training is completed, a convolutional neural network (CNN) model is deployed to an inference device, such as on a smartphone. As personal electronic devices, such as smartphones and tablet computers, become faster and more powerful, it is increasingly possible to perform machine learning on these personal electronic devices.

SUMMARY

This disclosure provides a mobile data augmentation engine for a personalized on-device deep learning system.

In a first embodiment, a method includes processing, using at least one processor of an electronic device, each of multiple images using a photometric augmentation engine, where the photometric augmentation engine performs one or more photometric augmentation operations. The method further includes applying, using the at least one processor, multiple layers of a convolutional neural network to each of the images, where each layer generates a corresponding feature map. In addition, the method includes processing, using the at least one processor, at least one of the feature maps using at least one feature augmentation engine between consecutive layers of the multiple layers, where the at least one feature augmentation engine performs one or more feature augmentation operations.

In a second embodiment, an electronic device includes at least one memory configured to store multiple images. The electronic device also includes at least one processing device configured to process each of the images using a photometric augmentation engine, where the photometric augmentation engine is configured to perform one or more photometric augmentation operations. The at least one processing device is also configured to apply multiple layers of a convolutional neural network to each of the images, where each layer is configured to generate a corresponding feature map. The at least one processing device is further configured to process at least one of the feature maps using at least one feature augmentation engine between consecutive layers of the multiple layers, where the at least one feature augmentation engine is configured to perform one or more feature augmentation operations.

In a third embodiment, a non-transitory machine-readable medium contains instructions that when executed cause at least one processor of an electronic device to process each of multiple images using a photometric augmentation engine, where the photometric augmentation engine is configured to perform one or more photometric augmentation operations. The medium also contains instructions that when executed cause the at least one processor to apply multiple layers of a convolutional neural network to each of the images, where each layer is configured to generate a corresponding feature map. The medium further contains instructions that when executed cause the at least one processor to process at least one of the feature maps using at least one feature augmentation engine between consecutive layers of the multiple layers, where the at least one feature augmentation engine is configured to perform one or more feature augmentation operations.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 8, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, machine learning has traditionally been performed on servers and other high performance computing devices due to high memory and processing power requirements. However, as personal electronic devices, such as smartphones and tablet computers, become faster and more powerful, it is increasingly possible to perform machine learning on these personal electronic devices. Such "on-device" machine learning can provide a number of benefits, including improved security, privacy, and low latency. However, on-device machine learning also faces various challenges. For example, there can be very limited training data for use in on-device machine learning due to storage constraints, which can result in overfitting of a machine learning model. Overfitting occurs when the machine learning model fits too well to the training data set. Also, there can be a lack of personalization when a machine learning model is trained using training data collected from different sources. If a user wants a machine learning model to be more personalized, the user typically must collect a large amount of training data in order to sufficiently train the machine learning model.

To address these or other issues, this disclosure provides a mobile data augmentation engine for a personalized on-device deep learning system. The disclosed data augmentation engine augments feature maps at one or more layers of a machine learning network instead of just augmenting the network input. The disclosed data augmentation engine overcomes overfitting effects by sufficiently diversifying the training process. In addition, the disclosed data augmentation engine is highly personalized by using user-provided images or other user-providing training data.

Compared with conventional input image augmentation approaches that have limited degrees of freedom in terms of diversification (such as random crop, rotation, contrast, hue, and the like), the degrees of freedom using the disclosed data augmentation engine grow exponentially as the engine operates deep inside the network. For each machine learning layer, a feature map can be subject to random geometric augmentation. One or more random skip branches add another degree of freedom to further augment the training process. The combined effect of per-layer augmentation is a diversified training process that is less likely to be subject to overfitting. Moreover, the combined effect cannot be approximated using conventional methods that only augment the training inputs. Therefore, the disclosed data augmentation engine provides a more generalized form of data augmentation in training neural networks.

Figure 1:
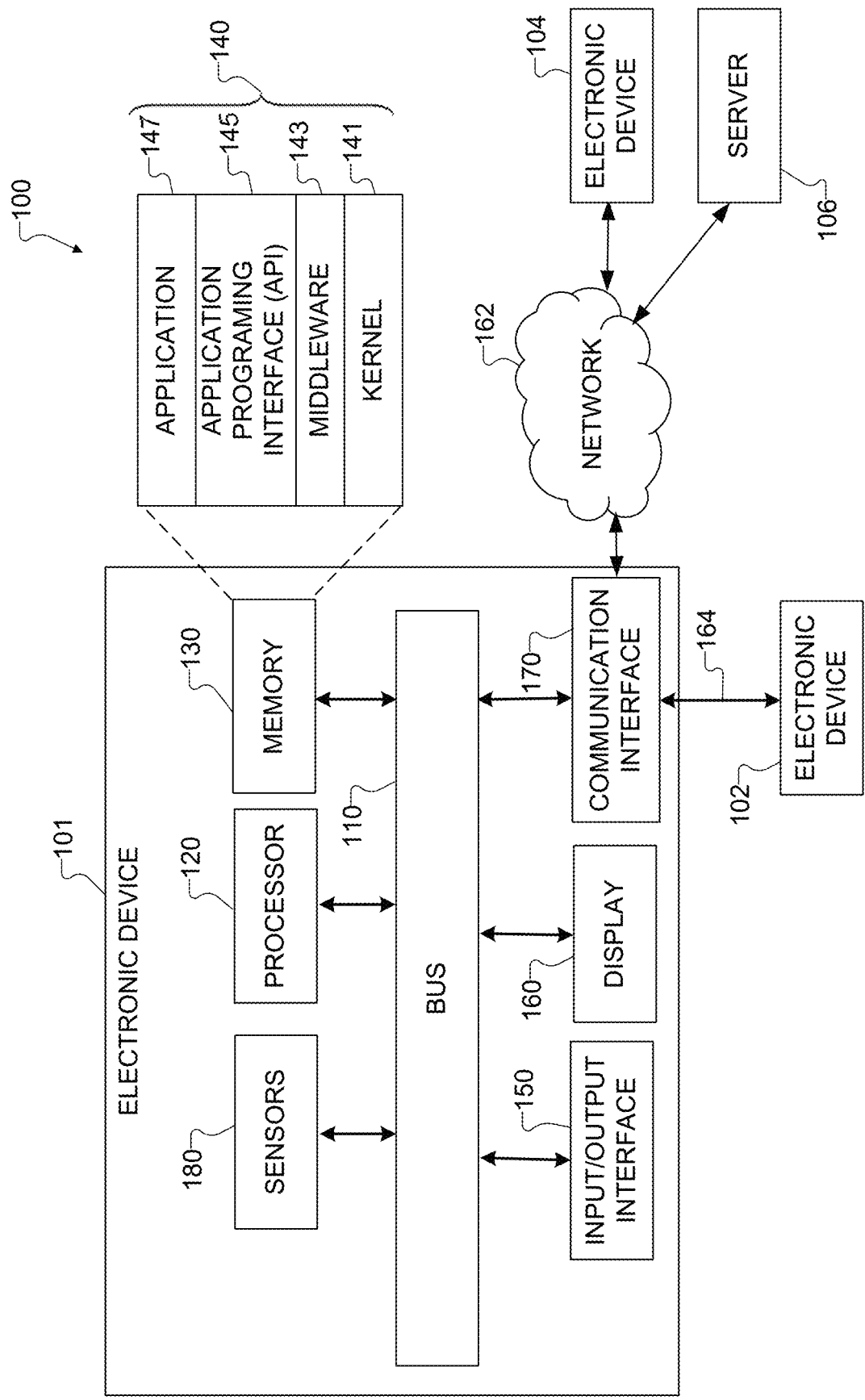
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). Also, in some embodiments, the processor 120 can obtain multiple images from at least one camera of the electronic device 101, process each of the images using a photometric augmentation engine that performs one or more photometric augmentation operations, apply multiple layers of a convolutional neural network (CNN) to each of the images (each layer generating a corresponding feature map), and process at least one of the feature maps using at least one feature augmentation engine between consecutive layers of the convolutional neural network that performs one or more feature augmentation operations.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
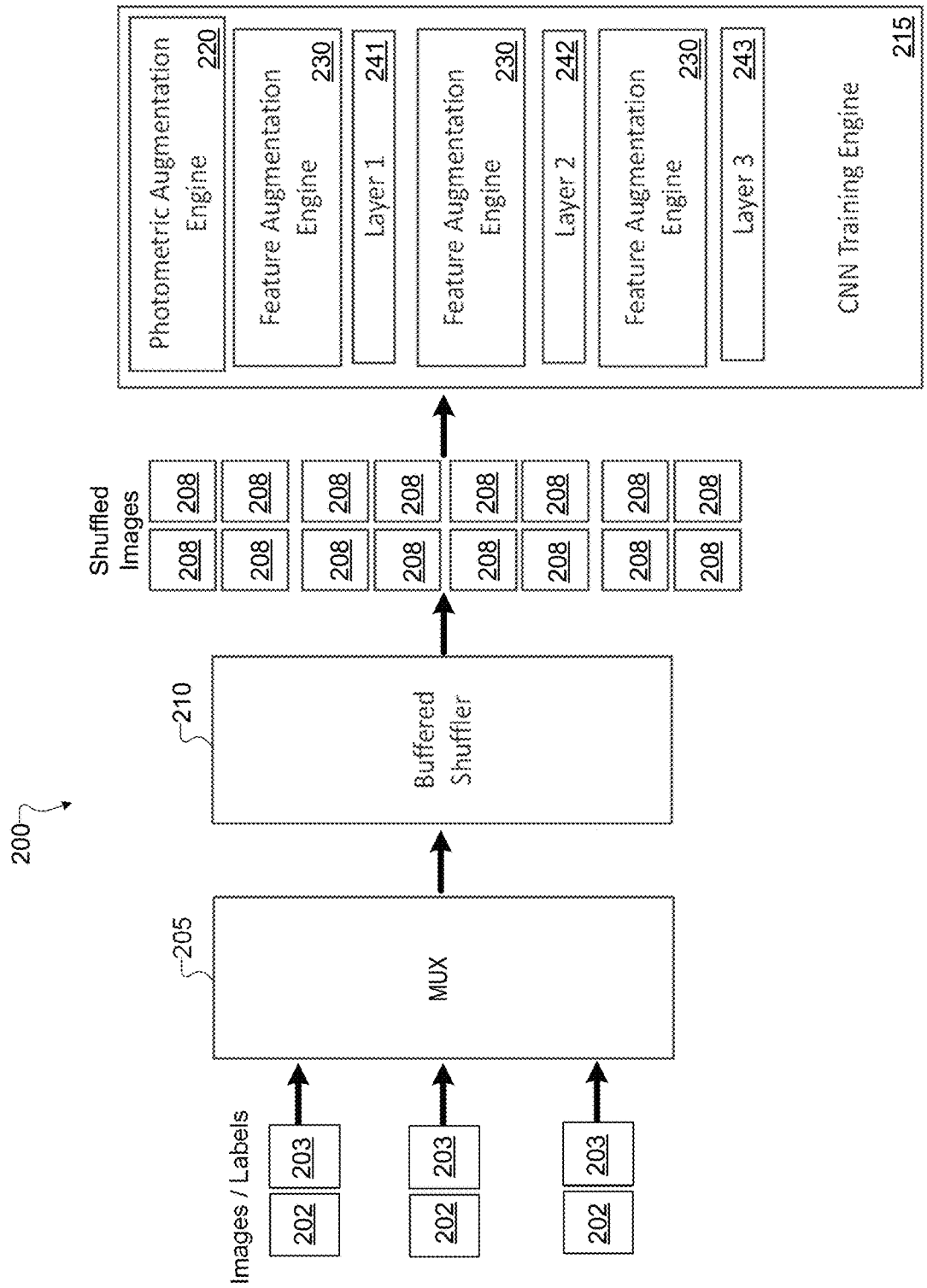
FIG. 2 illustrates an example on-device data augmentation engine according to this disclosure.

FIG. 2 illustrates an example on-device data augmentation engine 200 according to this disclosure. For ease of explanation, the data augmentation engine 200 is described as being implemented in the electronic device 101 shown in FIG. 1. However, the data augmentation engine 200 could be implemented in any other suitable electronic device and in any suitable system. As described below, the data augmentation engine 200 addresses data storage and diversification issues such that it is possible to train a machine learning model using a small number of user-provided images and labels that are stored on the electronic device 101.

As shown in FIG. 2, the data augmentation engine 200 includes a multiplexer 205, a buffered shuffler 210, and a CNN training engine 215. In some embodiments, the multiplexer 205, the buffered shuffler 210, and the CNN training engine 215 can be implemented using instructions that are stored in a memory 130 of the electronic device 101, such as a device random access memory (RAM). That is, the multiplexer 205, the buffered shuffler 210, and the CNN training engine 215 need not be stored in a long-term persistent storage of the electronic device 101.

The inputs to the data augmentation engine 200 include various user-provided images 202 and labels 203. This is in contrast to conventional deep learning systems, which typically receive thousands or millions of images as input. The images 202 are stored in a persistent storage memory 130 of the electronic device 101, such as a read only memory, hard drive, or Flash memory. At least some of the images 202 can be previously captured using a sensor 180 of the electronic device 101, such as a camera. Additionally or alternatively, at least some of the images 202 can be received at the electronic device 101 in other ways, such as by email or instant messaging. The labels 203 are associated with the images 202 and indicate some aspect or property of the image 202. For example, an image 202 depicting a cat may have associated label 203 indicating "cat." The labels 203 can be generated using any suitable techniques, such as generation by a user of the electronic device 101 in an image processing application or "app." While FIG. 2 depicts three images 202 and three labels 203, this is merely one example, and other embodiments could include other numbers of images 202 and labels 203. In general, though, the number of images 202 and labels 203 is much lower than that required for conventional deep learning systems.

These images 202 and labels 203 are read into the memory 130 and then multiplexed using the multiplexer 205, which replicates the images 202 one or more times into a larger number of images 202 so that overfitting is not likely to happen. The larger number of images 202 is input into a buffered shuffler 210, which randomly shuffles and reorganizes the images 202 into small batches of shuffled images 208 to be input into the CNN training engine 215. The randomization is performed so that each iteration of training of the CNN training engine 215 can be based on the same set of shuffled images 208, but the shuffled images 208 are input in a different order for each iteration and different subsets of the shuffled images 208 may be used for each iteration. For example, assume that the images 202 include images '0', '1', and '2', and the batch size is four. In such a case, batches of the shuffled images 208 could include, for example, {'1', '0', '2', '0'}, or {'2', '1', '0', '1'}, or the like.

Once each batch of training data including the shuffled images 208 is fed into the CNN training engine 215, the memory associated with the buffered shuffler 210 and holding the training data can be cleared to be ready to hold the next batch of shuffled images 208. There is no need to store the shuffled images 208 in a persistent storage of the electronic device 101. All (or substantially all) processing of the data augmentation engine 200 occurs using information in the memory (such as RAM) of the electronic device 101. Stated differently, the images 202 are augmented in memory, consumed by the CNN training engine 215, and then cleared from memory.

The CNN training engine 215 receives the batches of shuffled images 208 and performs augmentation operations on the shuffled images 208 and on feature maps generated during intermediate stages of the CNN training engine 215. The CNN training engine 215 is based on a CNN architecture. A CNN architecture generally represents a type of deep artificial neural network, which is often applied to analyze images. The CNN training engine 215 includes multiple layers 241-243, and at least some of the layers 241-243 include convolutional layers. A convolutional layer represents a layer of convolutional neurons, which operate to apply a convolution operation that emulates the response of individual neurons to visual stimuli. Each neuron typically applies some function to its input values (often by weighting different input values differently) to generate output values. The output values of at least some of the layers 241-243 include a feature map, which includes a number of features (such as 64, 128, 256, or other number of features). In some embodiments, one or more of the layers 241-243 can also or alternatively include one or more other types of layers found in a CNN architecture, such as transposed convolutional layers or pooling layers. While the CNN training engine 215 shown in FIG. 2 includes three layers 241-243, this is merely one example, and other embodiments could include a different number of layers.

In addition to the layers 241-243, the CNN training engine 215 also includes a photometric augmentation engine 220, which performs initial augmentation operations on the shuffled images 208. The photometric augmentation engine 220 generally operates to change one or more values or parameters associated with each pixel of each image 208. In some embodiments of the photometric augmentation engine 220, only the pixel values of the image 208 are possibly modified. That is, the photometric augmentation engine 220 may not perform operations that are applicable to feature maps, which are described in greater detail below.

Figure 3:
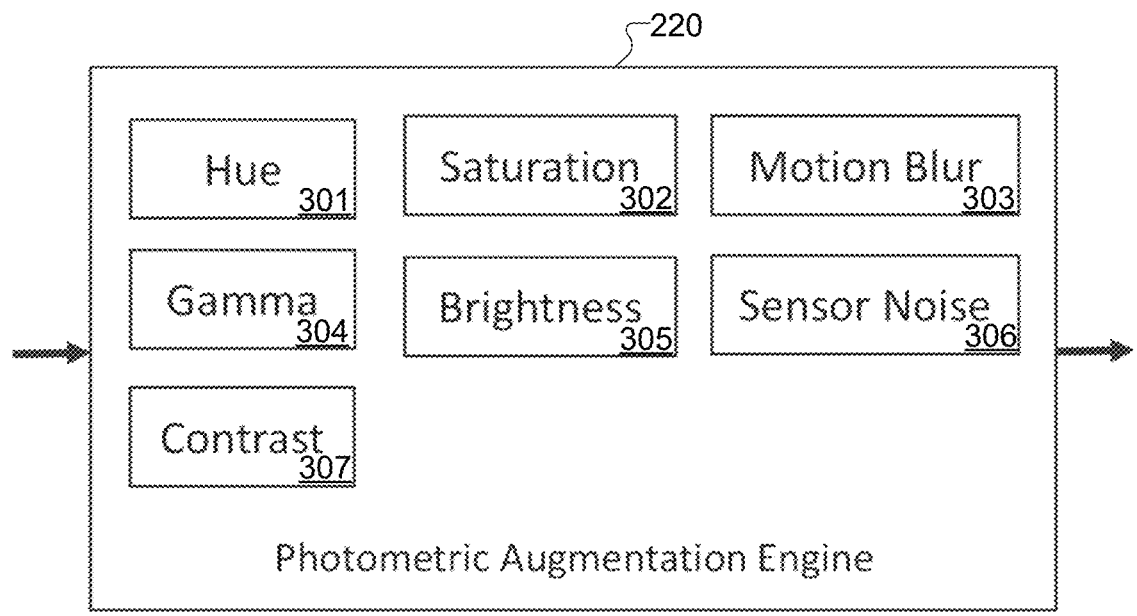
FIG. 3 illustrates additional details of a photometric augmentation engine of FIG. 2 according to this disclosure.

FIG. 3 illustrates additional details of the photometric augmentation engine 220 according to this disclosure. In some embodiments of the photometric augmentation engine 220, one or more photometric operations are randomly selected from a group of possible parameterized photometric operations 301-307 and performed on the images 208. As shown in FIG. 3, the possible photometric operations 301-307 from which the performed operations are selected include a hue operation 301 to adjust a hue of the image 208, a saturation operation 302 to adjust a saturation of the image 208, a motion blur operation 303 to adjust motion blur of the image 208, a gamma operation 304 to adjust a gamma level of the image 208, a brightness operation 305 to adjust a brightness level of the image 208, a sensor noise operation 306 to adjust sensor noise associated with the image 208, and a contrast operation 307 to adjust contrast of the image 208. The particular operations 301-307 selected and performed, and the order in which the selected operations 301-307 are performed can be randomized in the photometric augmentation engine 220 to promote diversity. In addition, random skipping can be implemented by the photometric augmentation engine 220 such that one, some, or all of the operations 301-307 are randomly skipped according to a specified probability.

Image augmentation performed by the photometric augmentation engine 220 may not be sufficient to diversify the training process if the number of user-provided training data is too small. For that reason, the CNN training engine 215 also includes multiple feature augmentation engines 230 to further diversify the training to avoid overfitting. The feature augmentation engines 230 can be placed anywhere inside the CNN topology of the CNN training engine 215 to randomly distort the feature maps produced by various layers of the CNN training engine 215 spatially. In general, augmentation of a feature map is different from augmentation of an image. For example, rotating an input image by ninety degrees is different from rotating a feature map by ninety degree because of the interaction of the convolutional kernels and Rectified Linear Unit (ReLU) nonlinearities. Augmenting a feature map is a more generalized way to sufficiently excite a machine learning network to make sure all corner cases can be covered. These corner cases are typically not all covered by just augmenting the input images.

As shown in FIG. 2, the feature augmentation engines 230 can be placed before or after the layers 241-243 and can be placed between consecutive layers 241-243. While the CNN training engine 215 shown in FIG. 2 includes three feature augmentation engines 230, this is merely one example, and other embodiments could include a different number of feature augmentation engines.

Figure 4:
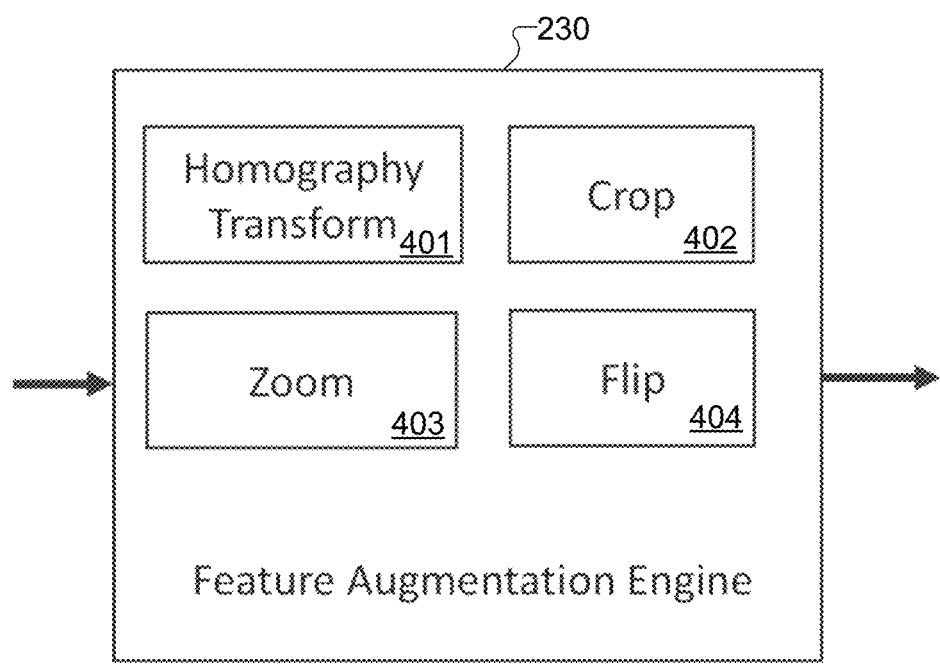
FIG. 4 illustrates additional details of each feature augmentation engine of FIG. 2 according to this disclosure.

FIG. 4 illustrates additional details of each feature augmentation engine 230 according to this disclosure. The feature augmentation engine 230 operates to change the geometric location of each of at least some of the pixels in the image 208 or in at least one of the feature maps from at least one of the layers 241-243. Stated differently, the feature augmentation engine 230 performs one or more geometric distortion operations. In the feature augmentation engine 230, one or more geometric operations are randomly selected from a group of possible parameterized geometric operations 401-404. As shown in FIG. 4, the possible geometric operations 401-404 from which the performed operations are selected include a homography transform operation 401 to transform (e.g., rotate or translate) a homography of the image 208 or feature map, a crop operation 402 to crop (e.g., trim) a size of the image 208 or feature map, a zoom operation 403 to change a scale of the image 208 or feature map, and a flip operation 404 to flip the image 208 or feature map along one or more axes. For example, the zoom operation 403 can be performed according to a scaling factor. In some embodiments, the scaling factor can be a value, such as between 0.8 (zoom out) and 1.2 (zoom in). A randomized zoom operation 403 selects a random scaling factor between 0.8 and 1.2 and applies that scaling factor to the portion of the image 208 or feature map subject to the zoom operation 403. As another example, the homography transform operation 401 can be performed by multiplying portions of the image 208 or feature map by a homography matrix, as described in greater detail below with respect to FIG. 6.

The particular operations 401-404 selected and performed and the order in which the selected operations 401-404 are performed can be randomized in the feature augmentation engine 230 to promote diversity. Moreover, the CNN training engine 215 supports randomized skipping of the feature augmentation engine 230 between one or more pairs of layers 241-243 according to a specified probability. That is, the CNN training engine 215 may choose to skip (not perform) the feature augmentation engine 230 between two consecutive layers 241-243 as described in greater detail below. The randomness of the operations performed or not performed ensures that the outputs of the CNN training engine 215 will always be different even for the same input.

Figure 5:
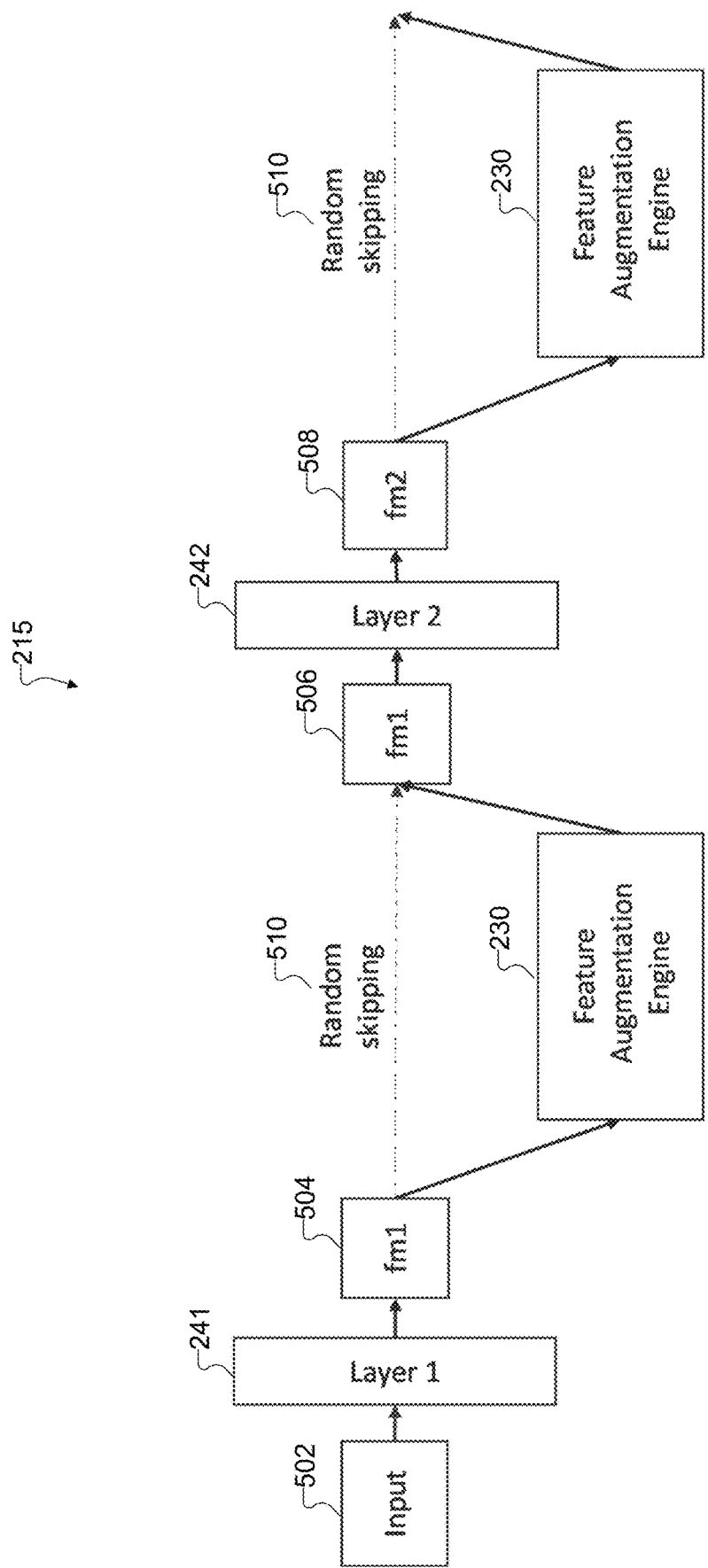
FIG. 5 illustrates additional details of randomly performing or skipping one of the feature augmentation engines in a convolutional neural network (CNN) training engine of FIG. 2 according to this disclosure.

FIG. 5 illustrates additional details of randomly performing or skipping one of the feature augmentation engines 230 in the CNN training engine 215 of FIG. 2 according to this disclosure. As shown in FIG. 5, the CNN training engine 215 provides an input 502 to the layer 241. In some embodiments, the input 502 can be one of the shuffled images 208 as received from the buffered shuffler 210. In other embodiments, the input 502 can be an image 208 that has already been augmented by the photometric augmentation engine 220. Once the layer 241 receives the input 502, the layer 241 processes the input 502, which generates a feature map 504. At this point, the feature augmentation engine 230 can process the feature map 504, or it can be skipped (as indicated by random skipping 510). If the feature augmentation engine 230 is used, an augmented feature map 506 is generated. If the feature augmentation engine 230 is skipped, the feature map 506 is the same as the feature map 504. The feature map 506 is input to the layer 242, which generates a feature map 508. At this point, the feature augmentation engine 230 can again be used or skipped. The process of using or skipping instances of the feature augmentation engine 230 can be repeated additional times, depending on the number of layers 241-243 in the CNN training engine 215. The random use or skipping of different instances of the feature augmentation engine 230 introduces multiple degrees of diversity along the network topology. This represents a higher degree of diversity compared to conventional input image augmentation engines.

Figure 6:
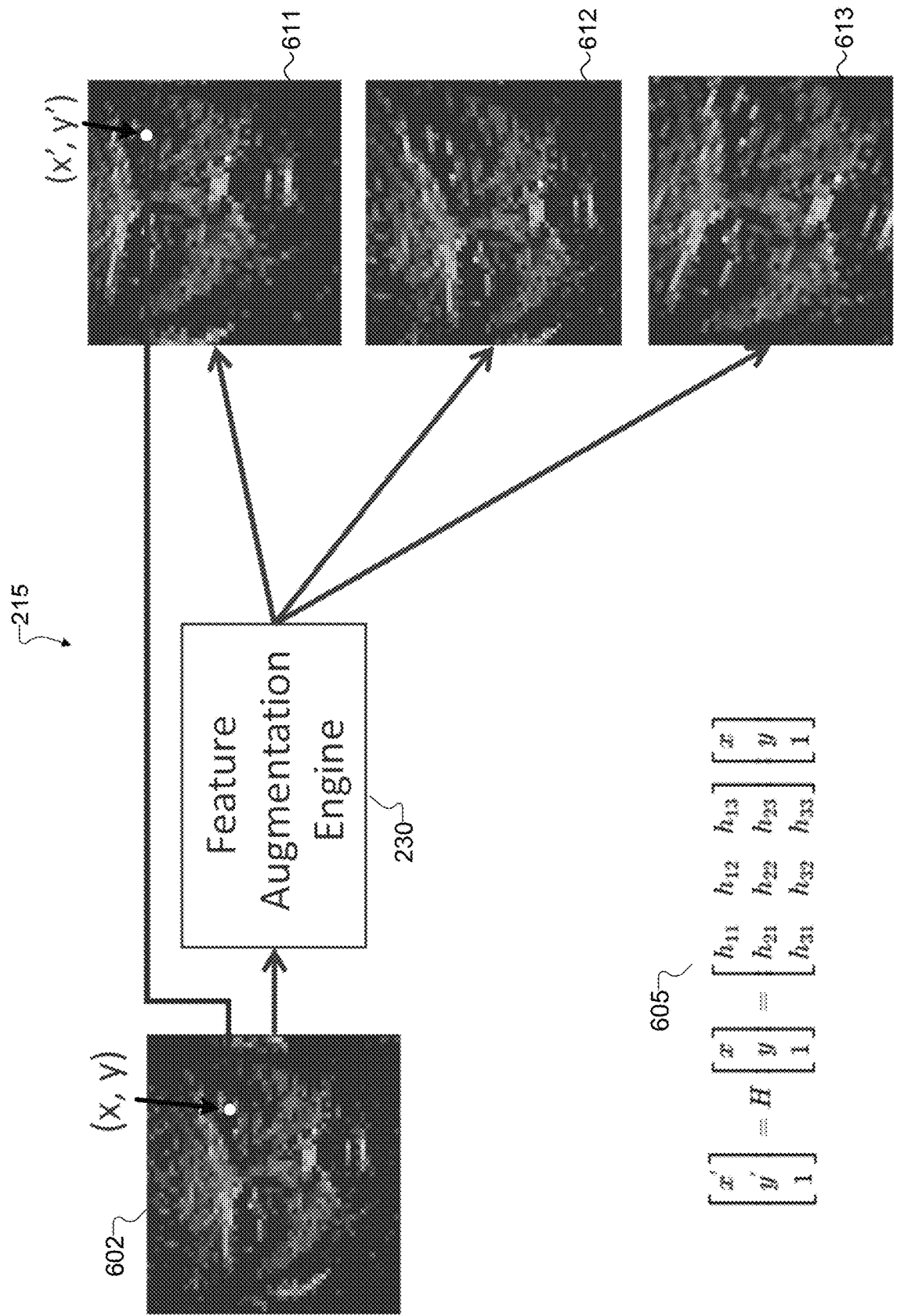
FIG. 6 illustrates multiple examples of augmented feature maps generated using the feature augmentation engines of FIG. 2 according to this disclosure.

FIG. 6 illustrates multiple examples of augmented feature maps generated using the feature augmentation engines 230 in the CNN training engine 215 according to this disclosure. As shown in FIG. 6, a feature augmentation engine 230 receives an input feature map 602. The input feature map 602 may represent, for example, the feature map 504 or the feature map 508 of FIG. 5. The feature augmentation engine 230 applies one or more of the geometric operations 401-404 to the input feature map 602. For example, in FIG. 6, the feature augmentation engine 230 applies a homography transform operation 401 to the input feature map 602. In the homography transform operation 401, the feature augmentation engine 230 multiplies pixels at locations (x, y) in the input feature map 602 by a randomized homography matrix H to obtain remapped coordinates (x', y') (as indicated, for instance, by the equation 605 in FIG. 6).

Depending on the values in the matrix H, the feature augmentation engine 230 can generate a number of possible augmented feature maps 611-613. In FIG. 6, three augmented feature maps 611-613 are shown, but the actual number of possible augmented feature maps may be much larger (such as thousands or millions of possible augmented feature maps). Different values can result in different levels of augmentation. For example, the augmented feature map 612 represents a lower level of augmentation because the augmented feature map 612 has an appearance that is rather similar to the input feature map 602. In contrast, the augmented feature map 613 exhibits much stronger augmentation than the augmented feature map 612 since the augmented feature map 613 exhibits more scaling and stretching than the augmented feature map 612. Randomizing the values of the matrix H results in highly diversified augmented feature maps 611-613. Different applications may benefit from different levels of augmentation. In addition, the feature augmentation engine 230 can be performed at multiple layers 241-243 in the network topology. The combined effect is a highly diversified CNN training engine 215 that results in a low risk of overfitting.

It should be noted that the operations and functions shown in FIGS. 2 through 6 can be implemented in an electronic device 101 in any suitable manner. For example, in some embodiments, the operations shown in FIGS. 2 through 6 can be implemented or supported using one or more software applications or other software instructions that are executed by the processor 120 of the electronic device 101. In other embodiments, at least some of the operations shown in FIGS. 2 through 6 can be implemented or supported using dedicated hardware components. In general, the operations shown in FIGS. 2 through 6 can be performed using any suitable hardware or any suitable combination of hardware and software/firmware instructions.

Although FIGS. 2 through 6 illustrate example details of an on-device data augmentation engine 200, various changes may be made to FIGS. 2 through 6. For example, while shown as a specific sequence of operations, various operations shown in FIGS. 2 through 6 could overlap, occur in parallel, occur in a different order, or occur any number of times (including zero times). Also, the specific operations shown in FIGS. 2 through 6 are examples only, and other techniques could be used to perform each of the operations shown in FIGS. 2 through 6.

Figure 7:
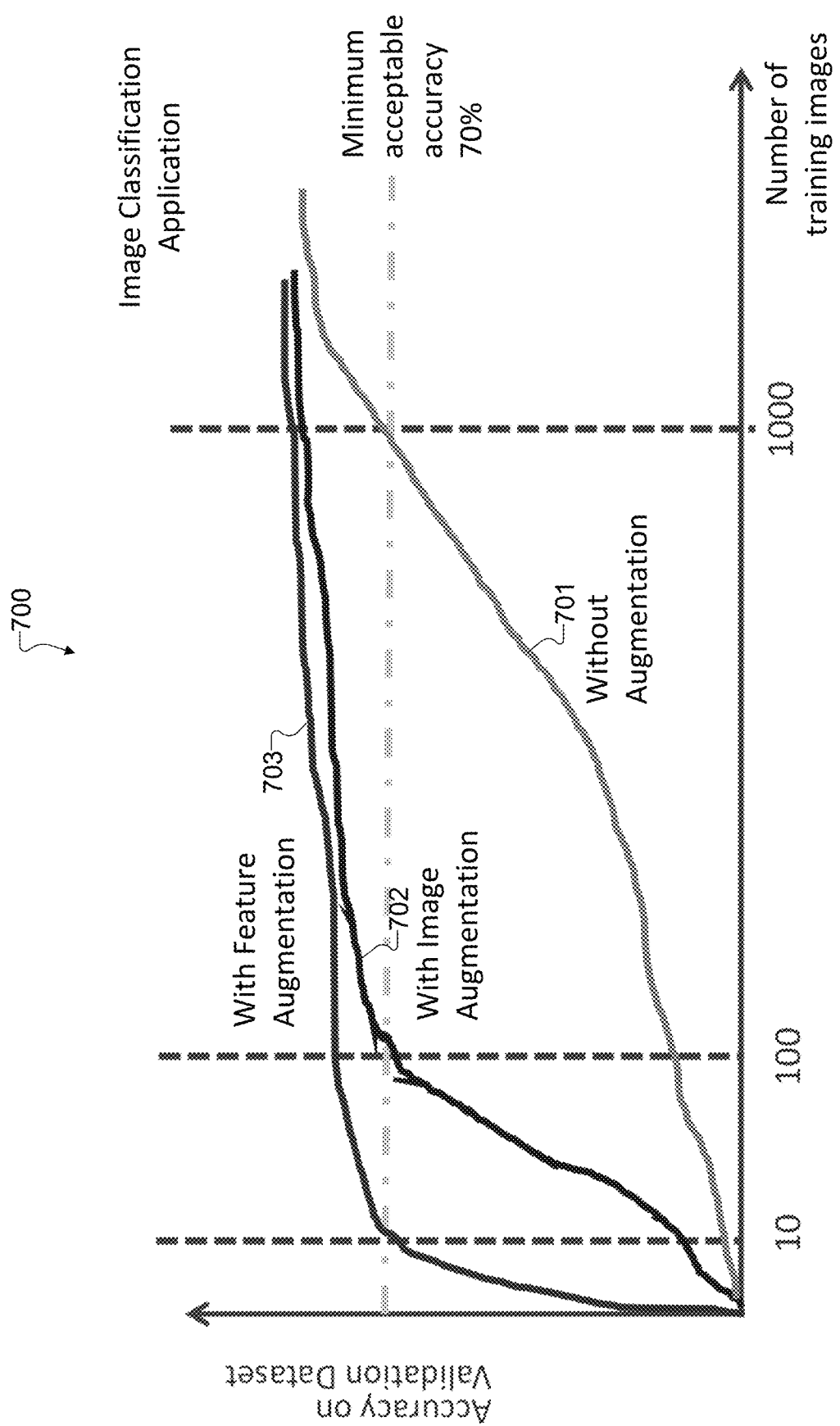
FIG. 7 illustrates an example chart showing benefits that can be realized using the on-device data augmentation engine of FIG. 2 according to this disclosure.

FIG. 7 illustrates an example chart 700 showing benefits that can be realized using the on-device data augmentation engine 200 according to this disclosure. As shown in FIG. 7, the chart 700 includes three curves 701-703. The curve 701 represents conventional training performed without any augmentation. The curve 702 represents training performed using only image augmentation. The curve 703 represents training performed using feature augmentation according to the disclosed embodiments. The curve 701 indicates that, without any augmentation, approximately 1000 images are required to train a machine learning network to reach a desired target accuracy (such as 70% accuracy, although this value could be higher or lower). With image augmentation as indicated by the curve 702, the number of required images is reduced to approximately 100 images. With feature augmentation as indicated by the curve 703, the number of required images is further reduced to approximately 10 images. Thus, feature augmentation can significantly reduce the number of training images required to reach a minimum acceptable accuracy.

In general, the on-device data augmentation engine 200 greatly increases diversity in the training data. In conventional training systems, if only an input image is augmented, there is a limited degree of freedom to diversify the data, such as rotation, squeeze, and the like. In contrast, the on-device data augmentation engine 200 includes feature augmentation, which can be performed on an image, one or more of its feature maps, or both and at one or multiple layers of the network topology. The introduces significantly more degrees of freedom as each layer can be subject to feature augmentation. Random skipping of the feature augmentation at one or more layers adds another degree of diversity. The combined diversity grows exponentially with more layers of the network.

Feature augmentation can be applied at any layer 241-243 inside the CNN training engine 215, including the input image 208. For object classification applications, feature augmentation is applicable to any layer 241-243 inside the CNN training engine 215 because the ground truth label is uncorrelated with the geometric deformation of the features. For object detection or semantic segmentation applications, the ground truth label is correlated with the geometric deformation of the feature.

Although FIG. 7 illustrates one example of a chart 700 showing benefits that can be realized using the on-device data augmentation engine 200, various changes may be made to FIG. 7. For example, the results shown here are merely meant to illustrate how one specific implementation of the on-device data augmentation engine 200 might be used to obtain beneficial results. FIG. 7 does not limit this disclosure to any particular on-device data augmentation engine 200 obtaining any particular results.

Figure 8:
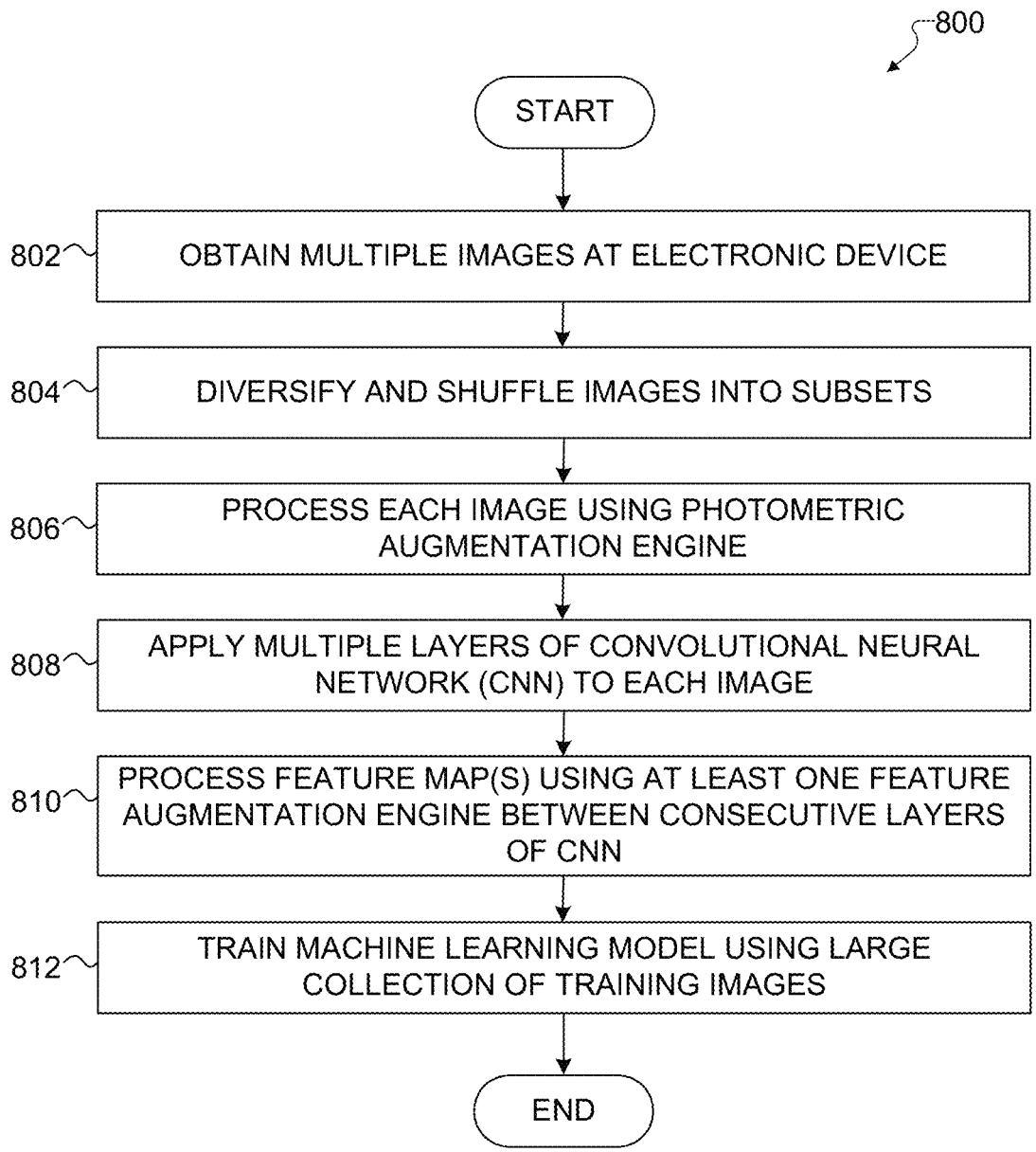
FIG. 8 illustrates an example method for performing on-device data augmentation according to this disclosure.

FIG. 8 illustrates an example method 800 for performing on-device data augmentation according to this disclosure. For ease of explanation, the method 800 shown in FIG. 8 is described as involving the use of the on-device data augmentation engine 200 shown in FIGS. 2 through 6 with the electronic device 101 shown in FIG. 1. However, the method 800 shown in FIG. 8 could be used with any other suitable electronic device and in any suitable system.

As shown in FIG. 8, multiple images are obtained at an electronic device at step 802. This could include, for example, the electronic device 101 using a camera to capture the images 202 or receiving the images 202 over a network. The images are diversified and shuffled into different subsets at step 804. This could include, for example, the electronic device 101 replicating the images 202 using the multiplexer 205 and shuffling the images into batches of shuffled images 208 using the buffered shuffler 210.

A photometric augmentation engine is used to process each of the images at step 806. This could include, for example, the electronic device 101 executing the photometric augmentation engine 220, which can perform a random selection of one or more of the photometric augmentation operations 301-307 with each image 208. Multiple layers of a convolutional neural network are applied to each of the resulting images at step 808. This could include, for example, the electronic device 101 applying multiple layers 241-243 of the CNN training engine 215 to each of the resulting images. Each layer 241-243 of the CNN training engine 215 is configured to generate a corresponding feature map. At least one feature augmentation engine between consecutive layers of the multiple layers is used to process at least some of the feature maps at step 810. This could include, for example, the electronic device 101 executing at least one feature augmentation engine 230 to process at least one of the feature maps 504, 508. Each feature augmentation engine 230 can perform a random selection of one or more of the feature augmentation operations 401-404. The resulting images may then be used for various purposes, such as training a machine learning algorithm, at step 812.

Although FIG. 8 illustrates one example of a method 800 for performing on-device data augmentation, various changes may be made to FIG. 8. For example, while shown as a series of steps, various steps in FIG. 8 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
processing, using at least one processor of an electronic device, each of multiple images using a photometric augmentation engine, the photometric augmentation engine performing one or more photometric augmentation operations;
applying, using the at least one processor, multiple layers of a convolutional neural network to each of the images, each layer generating a corresponding feature map;
processing, using the at least one processor, a first one of the feature maps using a first feature augmentation engine between a first pair of consecutive layers of the multiple layers, the first feature augmentation engine performing a first set of one or more feature augmentation operations on the first feature map;
processing, using the at least one processor, a second one of the feature maps using a second feature augmentation engine between a second pair of consecutive layers of the multiple layers, the second pair being different from the first pair, the second feature augmentation engine performing a second set of one or more feature augmentation operations on the second feature map, wherein the second set is different from the first set; and
determining, using the at least one processor, to randomly skip processing of a third one of the feature maps by a third feature augmentation engine between a third pair of consecutive layers of the multiple layers, the third pair being different from the first and second pairs;
wherein the one or more feature augmentation operations in each of the first and second sets are randomly selected from a group of possible feature augmentation operations.

2. The method of claim 1, wherein the one or more photometric augmentation operations are randomly selected from a group of possible photometric augmentation operations comprising two or more of: a hue operation, a saturation operation, a motion blur operation, a gamma operation, a brightness operation, a sensor noise operation, or a contrast operation.

3. The method of claim 1, wherein the group of possible feature augmentation operations comprises two or more of: a homography transform operation, a crop operation, a zoom operation, or a flip operation.

4. The method of claim 3, wherein:
the one or more feature augmentation operations comprise the homography transform operation; and
the homography transform operation is performed using a homography matrix, the homography matrix comprising one or more randomly-determined values.

5. The method of claim 1, further comprising:
diversifying the images and shuffling the images into different subsets before processing the images using the photometric augmentation engine.

6. The method of claim 1, wherein:
the one or more photometric augmentation operations comprise at least two photometric augmentation operations for each of the multiple images; and
the photometric augmentation engine performs the at least two photometric augmentation operations in a random order for each image.

7. The method of claim 1, wherein at least one of the multiple images was previously captured using a sensor of the electronic device.

8. An electronic device comprising:
at least one memory configured to store multiple images; and
at least one processing device configured to:
process each of the images using a photometric augmentation engine, the photometric augmentation engine configured to perform one or more photometric augmentation operations;
apply multiple layers of a convolutional neural network to each of the images, each layer configured to generate a corresponding feature map;
process a first one of the feature maps using a first feature augmentation engine between a first pair of consecutive layers of the multiple layers, the first feature augmentation engine configured to perform a first set of one or more feature augmentation operations on the first feature map;
process a second one of the feature maps using a second feature augmentation engine between a second pair of consecutive layers of the multiple layers, the second pair being different from the first pair, the second feature augmentation engine configured to perform a second set of one or more feature augmentation operations on the second feature map, wherein the second set is different from the first set; and
determine to randomly skip processing of a third one of the feature maps by a third feature augmentation engine between a third pair of consecutive layers of the multiple layers, the third pair being different from the first and second pairs;
wherein the one or more feature augmentation operations in each of the first and second sets are randomly selected from a group of possible feature augmentation operations.

9. The electronic device of claim 8, wherein the one or more photometric augmentation operations are randomly selected from a group of possible photometric augmentation operations comprising two or more of: a hue operation, a saturation operation, a motion blur operation, a gamma operation, a brightness operation, a sensor noise operation, or a contrast operation.

10. The electronic device of claim 8, wherein the group of possible feature augmentation operations comprises two or more of: a homography transform operation, a crop operation, a zoom operation, or a flip operation.

11. The electronic device of claim 10, wherein:
the one or more feature augmentation operations comprise the homography transform operation; and
the at least one processing device is configured to perform the homography transform operation using a homography matrix, the homography matrix comprising one or more randomly-determined values.

12. The electronic device of claim 8, wherein the at least one processing device is further configured to diversify the images and shuffle the images into different subsets before processing the images using the photometric augmentation engine.

13. The electronic device of claim 8, wherein:
the one or more photometric augmentation operations comprise at least two photometric augmentation operations for each of the multiple images; and
the photometric augmentation engine is configured to perform the at least two photometric augmentation operations in a random order for each image.

14. The electronic device of claim 8, further comprising: a sensor configured to capture at least one of the multiple images.

15. A non-transitory machine-readable medium containing instructions that when executed cause at least one processor of an electronic device to:
process each of multiple images using a photometric augmentation engine, the photometric augmentation engine configured to perform one or more photometric augmentation operations;
apply multiple layers of a convolutional neural network to each of the images, each layer configured to generate a corresponding feature map;
process a first one of the feature maps using a first feature augmentation engine between a first pair of consecutive layers of the multiple layers, the first feature augmentation engine configured to perform a first set of one or more feature augmentation operations on the first feature map;
process a second one of the feature maps using a second feature augmentation engine between a second pair of consecutive layers of the multiple layers, the second pair being different from the first pair, the second feature augmentation engine configured to perform a second set of one or more feature augmentation operations on the second feature map, wherein the second set is different from the first set; and
determine to randomly skip processing of a third one of the feature maps by a third feature augmentation engine between a third pair of consecutive layers of the multiple layers, the third pair being different from the first and second pairs;
wherein the one or more feature augmentation operations in each of the first and second sets are randomly selected from a group of possible feature augmentation operations.

16. The non-transitory machine-readable medium of claim 15, wherein the one or more photometric augmentation operations are randomly selected from a group of possible photometric augmentation operations comprising two or more of: a hue operation, a saturation operation, a motion blur operation, a gamma operation, a brightness operation, a sensor noise operation, or a contrast operation.

17. The non-transitory machine-readable medium of claim 15, wherein the group of possible feature augmentation operations comprises two or more of: a homography transform operation, a crop operation, a zoom operation, or a flip operation.

18. The non-transitory machine-readable medium of claim 15, further containing instructions that when executed cause the at least one processor to diversify the images and shuffle the images into different subsets before processing the images using the photometric augmentation engine.

19. The non-transitory machine-readable medium of claim 15, wherein:
the one or more photometric augmentation operations comprise at least two photometric augmentation operations for each of the multiple images; and
the photometric augmentation engine is configured to perform the at least two photometric augmentation operations in a random order for each image.

20. The non-transitory machine-readable medium of claim 15, wherein at least one of the multiple images was previously captured using a sensor of the electronic device.

* * * * *